W. H. DRUMMOND.
PIPES FOR HOT-AIR FURNACES.
No. 182,906. Patented Oct. 3, 1876
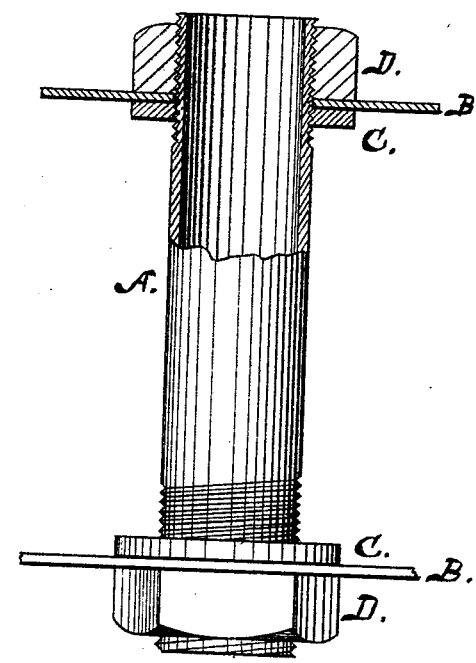
Witness
Horace Harris
A. L. Cross
Inventor
William H. Drummond

UNITED STATES PATENT OFFICE.

WILLIAM H. DRUMMOND, OF NEWARK, NEW JERSEY.

IMPROVEMENT IN PIPES FOR HOT-AIR FURNACES.

Specification forming part of Letters Patent No. 182,906, dated October 3, 1876; application filed February 4, 1876.

*To all whom it may concern:*

Be it known that I, WILLIAM H. DRUMMOND, of Newark, in the county of Essex and State of New Jersey, have invented a certain Improvement in Hot-Air Heaters, of which the following is a specification:

My invention consists in the pipe-fastenings of air-heating furnaces.

The figure is of a section of a heater—an inside pipe—and shows the mode of attachment to the heads of the cylinder, which comprises the one point of novelty. The lower end is shown whole and the upper end in section.

In ordinary hot-air heaters constructed with inside pipes the heads of the inside cylinders are made of cast-iron, with collars projecting inward from the face of the head, upward if at the bottom, and downward if at the top, and the pipes standing between the heads are slipped onto these collars; but it has been found difficult to make a tight connection, and in the expansion and contraction of the pipes by the heat there will be an annoying and unwholesome escape of gas into the room.

To remedy this difficulty is the object of this invention.

The pipes A, of which the one shown in the drawing is a representative, form a lock-nut connection with the heads B. The heads, made of wrought-iron, have the holes made in them the size of the pipes. These pipes are first prepared with the nut-collars C placed at the proper points for the length of the cylinder. The heads are then put in position, the pipes passing through the heads up to the collars C. The outside nuts D are then screwed on, and make so close a joint as to prevent the possibility of the escape of gas from the cylinder through this connection.

The nut-collars C may be made as permanent collars instead of nuts, and the heads resting against them. The pressure of the nuts D, when tightened up, would be the same.

Therefore, what I claim as my invention, and desire to secure by Letters Patent, is—

In an air-heating furnace, the combination of the pipes A, heads B, collars C, and nuts D, substantially as and for the purpose specified.

WILLIAM H. DRUMMOND.

Witnesses:
HORACE HARRIS,
A. L. CROSS.